Sept. 2, 1947.  J. KIEFFER  2,426,884
RADIOGRAPHY
Filed May 13, 1944  2 Sheets-Sheet 1
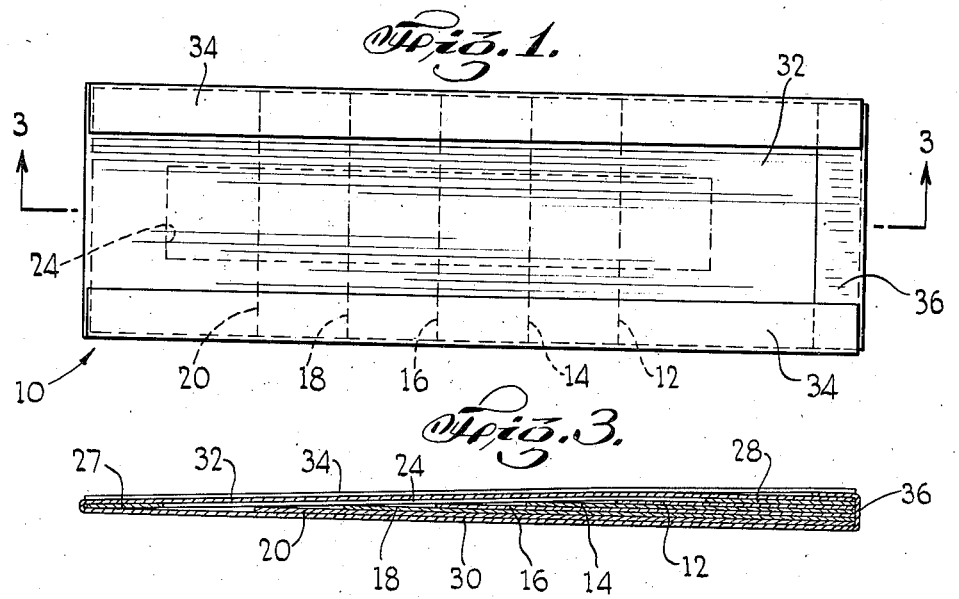
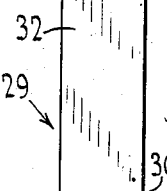
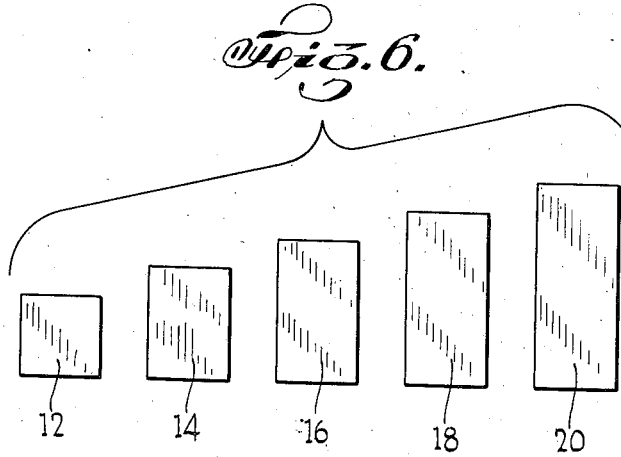
INVENTOR.
JEAN KIEFFER
BY
ATTORNEY

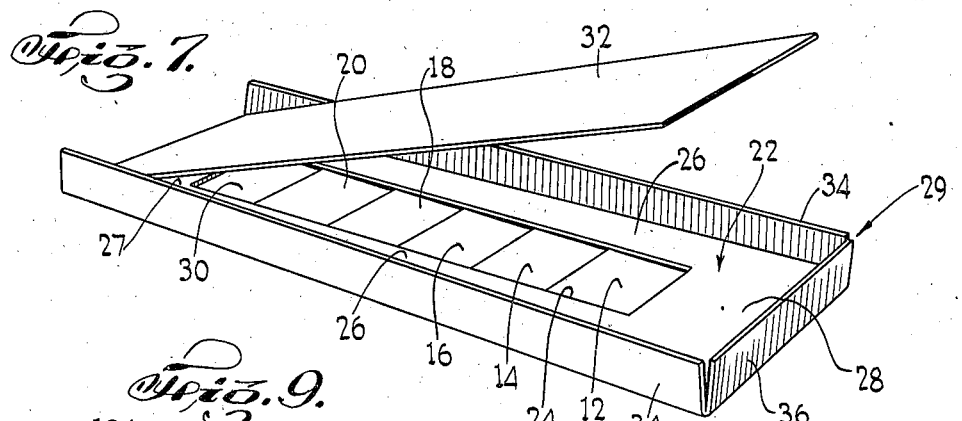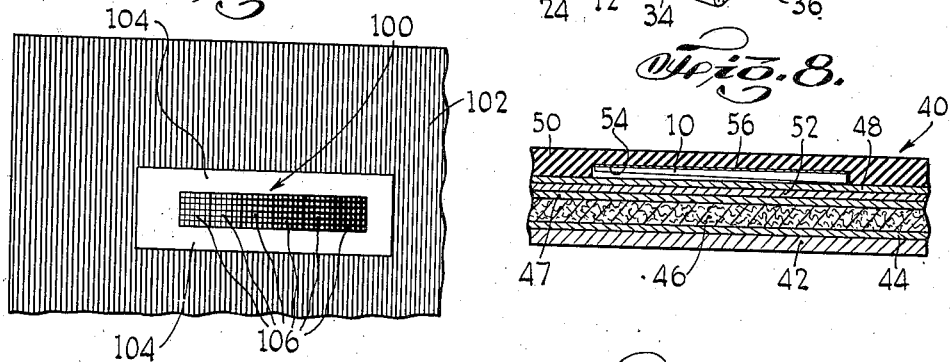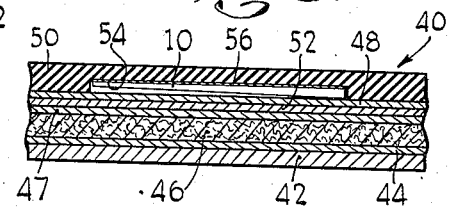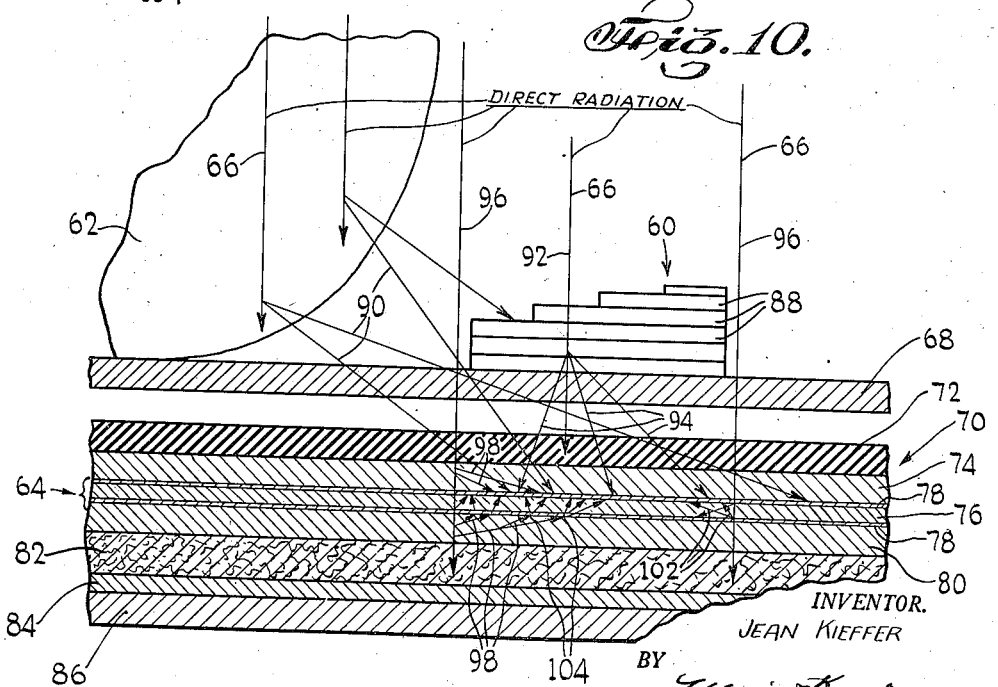

Patented Sept. 2, 1947

2,426,884

UNITED STATES PATENT OFFICE 2,426,884

RADIOGRAPHY

Jean Kieffer, Norwich, Conn.

Application May 13, 1944, Serial No. 535,459

10 Claims. (Cl. 250—65)

This invention relates to radiography and, more particularly, is concerned with a device for facilitating the control, comparison and standardization of "total operating radiographic techniques," this term being used herein to denote the cumulative effect of all variable steps performed by the operator which affect the density of a radiograph.

Although it will be appreciated that this device is useful for all types of radiographic techniques, said device will be described herein in relation to radiographic chest technique only, it being understood that such description is illustrative and is not to be considered as limiting the scope of the invention.

Ordinarily a radiographic operator endeavors to obtain a radiograph of optimum diagnostic quality, and in so doing, controls the many variables which affect the ultimate quality of the radiograph. These variables include the physical character of the patient, the measurement of the patient, the phase of respiration during which exposure is made, the relative position of the patient, film and tube, the time of exposure, the processing, and the type, quality and state of the radiographic equipment, which includes the tube, diaphragm, film, cassette and intensifying screens.

Although the result of such technique is usually satisfactory for a single radiograph, it has serious drawbacks for a series of radiographs made over a period of time to determine the course of a disease such, for example, as tuberculosis, because the variables are not controlled within the limits of duplication necessary in serial radiographs for the accurate evaluations of small changes in a patient's disease.

It is, therefore, a primary object of my invention to provide an improved means for printing on a radiograph an image having a density or graded series of densities which are an exact function of all the variables controllable by the operator.

A more specific object of the invention is to provide a test object in the form of a step tablet of such construction that the graded densities produced thereby are not affected, within the degree of accuracy exercisable by an operator, by the height or thickness of the test tablet, its distance from the film or scattered radiations around the edge of the tablet.

Another object of the invention is to provide a step tablet of the character described, having a large enough number of graded densities to enable the two extreme densities of any radiograph of a patient to be controlled and compared.

An additional object of the invention is to provide test tablets whose several steps offer accurate predetermined resistances to the passage of X-rays.

A further object of the invention is to provide a step tablet whose radiographic image is of such nature that it may be easily visually compared with the radiographic image of another step tablet or with a standardized series of similar radiographic test images.

Yet another object of the invention is to provide a step tablet which comprises relatively few and simple parts and is economical to manufacture, but which is, nevertheless, highly accurate and efficient in use. An ancillary object of the invention is to provide a step tablet in combination with a cassette, whereby to minimize scattering of radiation.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

In the accompanying drawings, in which is shown one of the various possible embodiments of this invention, and in which like reference numerals refer to like parts throughout, Fig. 1 is a plan view of a step tablet embodying my invention;

Fig. 2 is a side elevational view thereof;

Fig. 3 is a sectional view through the tablet, taken substantially along the line 3—3 of Fig. 1;

Fig. 4 is a plan view of a blank from which the casing of the step tablet is formed;

Fig. 5 is a plan view of a lead mask used in the tablet;

Fig. 6 is a plan view of a series of strips employed in the tablet;

Fig. 7 is a perspective view of the tablet with the casing partially formed and the strips and mask therein;

Fig. 8 is a fragmentary sectional view through an X-ray cassette with a step tablet incorporated therein;

Fig. 9 is a fragmentary view of a radiograph with an image of a step tablet thereon; and Fig. 10 is a schematic view of an old aluminum step tablet in use showing the various scattered radiations which rendered the densities of the images beneath said tablet highly inaccurate.

In general, I carry out my invention by providing a stacked series of strips of successively greater lengths which form a shallow miniature flight of stairs whose steps comprise a progressively varying number of overlying strips. The strips are made from a heavy metal which will pass X-rays but is considerably more resistant to their passage than aluminum, whereby the overall height of the tablet is kept small and the tablet can be secured directly to a cassette without interfering with the normal manipulation thereof. This enables the tablet to be placed very close to the film and will substantially exclude scattered radiations from the tablet and patient's body. In addition, the step tablet is provided with a wide lead border along an edge over which the thickness of the tablet varies. This substantially eliminates scattered edge radiations due to halation and the use of intensifying screens. Said lead border also provides a clear border on the edge of the image having graded densities, so that two images can be visually examined side by side for comparison of their densities or for control or standardization of their total operating radiographic techniques.

Referring now to the drawings, and more particularly Figs. 1–7, 10 denotes a step tablet embodying my invention. Said tablet essentially includes a series of strips 12, 14, 16, 18 and 20, of equal widths and progressively greater lengths, fabricated from a material which will modulate an X-ray beam to a degree substantially greater than aluminum. Preferably the resistance of this material to the passage of X-rays is such that a thickness thereof, which will absorb as much of an X-ray beam as about seven-eighths of an inch of aluminum, will be thin enough to be placed on top of or in a cassette without interfering with the operation or manipulation thereof. A material I have found satisfactory for this purpose is copper, a copper layer about 0.75 mm. thick having the same stopping capacity to X-rays as seven-eighths of an inch of aluminum, at an X-ray generating range between 50 and 100 kilovolts.

The configuration and plan dimensions of these strips 12—20 are not critical and need only be such that the step tablet can be placed upon a portion of the cassette where it will be clear of the patient being X-rayed. By way of example, I have shown the strips as having a generally rectangular configuration, the strip 12 being 16 x 16 mm., the strip 14 16 x 22 mm., the strip 16 16 x 28 mm., the strip 18 16 x 34 mm. and the strip 20 16 x 40 mm. When these strips are stacked with a set of end edges in registration, they will provide a series of 6 x 16 mm. steps, of which consecutive steps constitute a progressively varying number of strips.

Although the dimensions and configurations of the strips are not critical, uniformity of their average areal densities is—that is, the weight of the strips per unit of surface area must be closely controlled. In the illustrated example, all of the strips have an average areal density of approximately 0.0950 gm. per square cm. It is important that this characteristic of the strips, rather than their thickness, be constant, for strips of such small thickness are customarily rolled and I have determined that strips of equal thicknesses often exhibit varying absorption of X-rays due to their different densities.

It may be mentioned at this time that although in the preferred form of my invention I have disclosed these steps as having areal densities which vary in arithmetical progression, in other forms of the invention the density of the steps may vary in a different manner, as will be described later.

The step tablet also includes a lead mask 22 whose outer configuration is substantially the same as that of the strips 12—20 but which is longer than the longest of said strips. This mask in the instant embodiment of the invention is 16 mm. wide and 51 mm. long. The mask is provided with a centrally disposed slot 24 which preferably terminates closer to one of the ends of the mask than the other, and which provides longitudinal borders 26 and end borders 27, 28.

By way of example, the slot shown is 6 mm. across which leaves the longitudinal borders 5 mm. wide. The slot is 36 mm. long and so disposed as to make one end border 27 5 mm. wide and the other end border 28 10 mm. wide. The lead is sufficiently thick, e. g. about 0.5 mm., to stop appreciably all X-rays of the intensity employed for taking chest radiographs, so that the image printed by the tablet upon a radiograph will consist of a linear series of steps of varying densities, each 6 mm. wide and 6 mm. long, surrounded by a clear border 5 mm. wide on both sides and one end, and 10 mm. wide on the other end.

The tablet additionally includes a casing 29, preferably of the same material and areal density as that from which the strips 12—20 are fabricated. Said casing comprises a base 30, a cover 32 integrally connected to the base, a pair of side flanges 34 extending away from the lateral edges of the base 30, and an end flange 36 projecting from the edge of said base opposite to that from which the cover 32 extends. The base and cover are both 16 x 51 mm. and the flaps are 4.5 mm. wide so as not to project over the slot 24 in the finished tablet.

To assemble the tablet, the casing 29 is partially folded as indicated in Fig. 7; that is, the side and end flanges 34 and 36 and cover 32 are folded to extend away from the same side of the base. Then the strips 12—20 are inserted in order of length with the longest strip 20 lowermost and an end thereof abutting the end flange 36. The next longest strip 18 is placed upon the strip 20, the strip 16 on the strip 18, the strip 14 on the strip 16 and the strip 12 on the strip 14, each with an end thereof abutting the end flange 36. Next the lead mask 22 is inserted with the wide border thereof abutting the end flange 36 where the tablet is thickest. This serves as check for fog. Now the folding of the tablet is completed, the cover first being brought flat against the lead mask, the end flange 36 against the cover, and the lateral flanges 34 against the cover and end flange. The completed tablet now is of the appearance illustrated in Figs. 1 and 2, being 16 mm. wide, 51 mm. long and about 1.5 mm. high at its thickest end.

It will be appreciated that with a step tablet such as described, an image having six steps of different densities will be printed upon a radiograph, the densities being those resulting from the passage of X-rays through from two to seven layers of copper foil, each having an areal density of 0.0950 gm. per square cm. The two copper layers which form the step of least density are the cover and base since the combined length of the slot 24 and the widest border 28 is 46 mm., 6 mm. longer than the longest strip 20. I have found that this number of steps and the selected areal density of the foil will obtain a satisfactory range of densities on the radiograph, i. e. a range in which, regardless of the total operator radiographic technique, a density near the median density of the diagnostic field is obtained on at least one step of the image. It will be understood, however, that the number of steps and the densities of each strip or of all the strips may be varied in accordance with the specific operator technique with which the step tablet is to be employed.

In making up step tablets, a number of pieces of copper foil having an areal density of approximately 0.0950 gm. per square cm. and between 0.0960 and 0.0940 gm. per square cm. are selected. I use the piece of foil closest to 0.0950 gm. per square cm. to form the blank for the casing 29, since two layers of the casing are part of each step. The remaining strips 12—20 may be so selected that if one strip has an areal density in certain excess of 0.0950 gm. per square cm. another strip is employed having an areal density about that much less than 0.0950 gm. per square cm. I have found that for ordinary use, an accuracy of this order is ample.

It will be obvious that a step tablet as thin and small as that described may be placed directly on a cassette without interfering with the manipulation thereof, this being in contrast to an equivalent aluminum step tablet which is almost an inch high and which, if attached to a cassette would prevent the cassette from being inserted in a cassette changer.

The step tablet may be directly affixed to the outer surface of a cassette in any suitable manner, as for example, by cementitiously securing the step tablet to the said surface of the cassette with material of negligible absorption to X-rays. Alternately, the side of the cassette exposed to X-rays may be provided with a shallow recess in which the wafer-thin step tablet can be inserted so as not to project above the surface thereof. Such recess can either be on an external or internal surface of the cassette.

In Fig. 8 I have shown the step tablet incorporated in a cassette 40 of standard construction. Said cassette comprises a backing sheet 42 covered with a layer 44 of tin-foil designed to absorb secondary rays, the sheet 44 carrying a layer 46 of resilient material, such as felt. A back intensifying screen 47 is fixed to the felt layer 44 by suitable means, such as glue, while a front intensifying screen 48 is similarly fixed to the inside surface of a front plate 50 of any suitable material which freely passes X-rays, e. g. Bakelite. A double coated film 52 is disposed between the two intensifying screens and there held by resilient spring means (not shown) of conventional design.

Pursuant to an ancillary feature of my invention, the inner surface of the Bakelite panel 52 is provided with a shallow recess 54 sufficiently large and deep to fully accommodate a step tablet 10 which is secured therein with a layer of adhesive 56. In this fashion the step tablet is disposed in very close proximity to the film.

By virtue of its thinness and consequent ability to be placed extremely near the film, step tablets embodying my invention have greatly reduced the effect of scattered radiation and thus produce an image beneath each of the tablets whose range of densities is an accurate function of the total technique of an operator.

To better appreciate the manner in which my improved step tablet reduces scattered radiations, I have shown in Fig. 10 a previously used aluminum step tablet 60 in conventional position relative to a patient 62, a film 64 and an X-ray tube (not shown) emanating direct radiations 66. The patient is reclining upon the top 68 of a cassette changer, in which the cassette 70 is slidably received. The cassette includes a front panel 72 of Bakelite and a front intensifying screen 74, behind which is the film 64 comprising a carrier layer 76 whose faces are coated with solid gelatinous emulsions 78 having radiographically sensitive particles uniformly dispersed throughout. On the other side of the film is a back intensifying screen 80, a layer of felt 82, a stopping plate 84 and a back cover 86. The step tablet 60 comprises a plurality of stacked layers 88 of aluminum which, for effective use, have a maximum total height of almost one inch. This height is greater than the distance between the Bakelite panel 72 and top 68 of the cassette changer, so that the step tablet cannot be disposed directly on the cassette 70 but must be placed in its illustrated position on top of the cassette changer. This interposes a substantial space between the innermost layer of the step tablet and the film. Scattered radiations 90 emanating from the patient's body pass through such space and affect the radiographically sensitive particles of the film emulsions beneath the step tablet. In addition, direct radiation 92 striking the aluminum step tablet will emit scattered radiation 94 which likewise will spread out and affect the densities of the different steps of the image. The effect of this latter scattered radiation is enhanced by the height of the tablet. The direct rays 96 around the contour of the step tablet give rise to another type of scattered radiation. Where these rays strike the front and back intensifying screens they cause scattered radiations 98 throughout the thickness of said screens. Additionally, where the actinic rays engendered by these direct X-rays 96 strike the emulsions, there will be a scattering of the actinic rays in the emulsion, as indicated at 102. These latter two effects combine, as indicated at 104. The scattered radiations due to the thicknesses of the screens and emulsions, hereinafter referred to as "halation," are only border discrepancies, but, since they are caused by unmodulated direct X-rays, they extend quite far into the steps of the image. The total effect of these various scattered radiations increases the densities of the steps of the image in the radiograph by as much as the median density of the diagnostic field.

My improved step tablet substantially eliminates the effect of scattered radiation from the patient's body by permitting the space between the step tablet and film to be greatly reduced, since, owing to the thinness of the step tablet, it may be placed very close to the film. Any scattered radiation from the patient's body which enters between the slight space left between the step tablet and film is cut off by the borders 26 provided by the lead mask.

The scattered radiation caused by the layers of the step tablet itself is minimized by employing layers of very small thicknesses. This scattered radiation is now present only approximately 0.5 mm. inside the boundary of each step, so that it is barely noticeable.

The variations in densities due to halation are substantially reduced, since all such variations caused by direct radiation are eliminated by the lead borders of the slot 24 and that caused by the X-rays partly absorbed by the tablet is not appreciable.

The step tablet should be placed in a position where it will receive direct radiation from the X-ray tube. For chest radiographs a satisfactory location is 25 mm. from the upper and side edges of the film above the shoulder shadow.

The step tablet will produce an image 100 (Fig. 9) on a radiograph 102, which image is surrounded on all four sides by a clear boundary 104 and comprises a series of six steps 106 of varying densities. Since these densities are affected by all variables under the operator's control and are unaffected by scattered radiation or the measurements or condition of a patient, they afford a measurement of the total technique of the operator.

Although the increments between the areal densities of consecutive steps in the tablet 10 are substantially uniform, the densities of successive steps in the image vary approximately logarithmically due to the characteristics of conventional film used for the purpose. I have found that such condition does not lessen the utility of the tablet for any of its present uses. Nevertheless, if desired, the densities of the images may be made to vary in approximate arithmetical progression by having the increments between the areal densities of successive steps of the tablet increase logarithmically.

It will thus be seen that there is provided a device and method of using the same in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure my Letters Patent:

1. A radiographic test object comprising a step tablet including several overlying layers of a foil of a heavy metal having an X-ray absorption greater than aluminum and less than lead, each layer being of a predetermined areal density and at least one set of edges of said layers being progressively non-registered, and a border member of a material more opaque to X-rays than said metal, said member having an edge thereof extending transversely across said progressively non-registered edges.

2. A radiographic test object comprising a step tablet including several overlying layers of a foil of a heavy metal having an X-ray absorption greater than aluminum and less than lead, each layer being of a substantially uniform, predetermined areal density and at least one set of edges of said layers being progressively non-registered, and a border member of a material more opaque to X-rays than said metal, said member having a slot a pair of whose opposed edges extend transversely across said progressively non-registered edges.

3. A radiographic test object comprising a step tablet including several overlying layers of a foil of a heavy metal having an X-ray absorption greater than aluminum and less than lead, at least one set of edges of said layers being progressively non-registered, and a border member of a material more opaque to X-rays than said metal, said border having an edge thereof extending transversely across said progressively non-registered edges.

4. A radiographic test object comprising a step tablet including several overlying layers of a foil of a heavy metal having an X-ray absorption greater than aluminum and less than lead, at least one set of edges of said layers being progressively non-registered, and a border member of a material more opaque to X-rays than said metal, said member having an elongated slot a pair of whose opposed edges extend transversely across said progressively non-registered edges.

5. A radiographic test object comprising a step tablet including several overlying layers of copper foil each having a substantially uniform, predetermined areal density, at least one set of edges of said layers being progressively non-registered, and a lead border member having an edge thereof extending transversely across said progressively non-registered edges.

6. A radiographic test object comprising a step tablet including several rectangular overlying layers of copper foil of equal width, one set of end edges and both sets of side edges being in registration, said layers being of progressively greater length so that an end edge of each layer projects beyond an edge of the overlying layer, a lead mask having an elongated slot therein, said mask being of the same width as said layers and having its side edges and one end edge in registration with the registered set of side edges and end edges, the lateral edges of said slot extending transversely over the progressively non-registered edges of said layers, and an end of said slot being disposed over a portion of the shortest layer, said layers and said mask being enclosed in a copper casing.

7. A radiographic test object comprising a step tablet including several rectangular overlying layers of copper foil of equal width, one set of end edges and both sets of side edges being in registration, said layers being of progressively greater length so that an end edge of each layer projects beyond an edge of the overlying layer, a lead mask having an elongated slot therein, said mask being of the same width as said layers and having its side edges and one end edge in registration with the registered set of side edges and end edges, the lateral edges of said slot extending transversely over the progressively non-registered edges of said layers, and an end of said slot being disposed over a portion of the shortest layer, said layers and said mask being enclosed in a copper casing which includes a base and a cover overlying and underlying, respectively, the opposite wide faces of said combined layers and mask, and means to hold said base and cover together, said means being out of registration with the slot in said mask.

8. An X-ray cassette comprising a cover adapted to freely pass X-rays and a radiographic test object secured to and immediately adjacent said cover, said test object including several overlying layers of foil of a heavy material having an X-ray absorption greater than aluminum and less than lead, at least one set of edges of said layers being progressively non-registered.

9. An X-ray cassette comprising a cover adapted to freely pass X-rays and a radiographic test object secured to and immediately adjacent said cover, said test object including several overlying layers of copper foil, at least one set of edges of said layers being progressively non-registered.

10. An X-ray cassette comprising a cover adapted to freely pass X-rays and having a space in which films are adapted to be received, said cover having secured immediately adjacent the same and on the side thereof facing the film receiving space a radiographic test object which includes several overlying layers of foil of a heavy metal having an X-ray absorption greater than aluminum and less than lead, at least one set of edges of said layers being progressively non-registered.

JEAN KIEFFER.

REFERENCES CITED

The following references are of record in the file of this patent:

UNITED STATES PATENTS

| Number | Name | Date |
|---|---|---|
| 1,973,906 | Levene et al. | Sept. 18, 1934 |
| 2,258,593 | Black | Oct. 14, 1941 |
| 1,953,249 | Michel | Apr. 3, 1934 |